May 15, 1945.    W. A. RAY    2,375,870
CONTROL SYSTEM
Original Filed Oct. 2, 1939    2 Sheets-Sheet 1
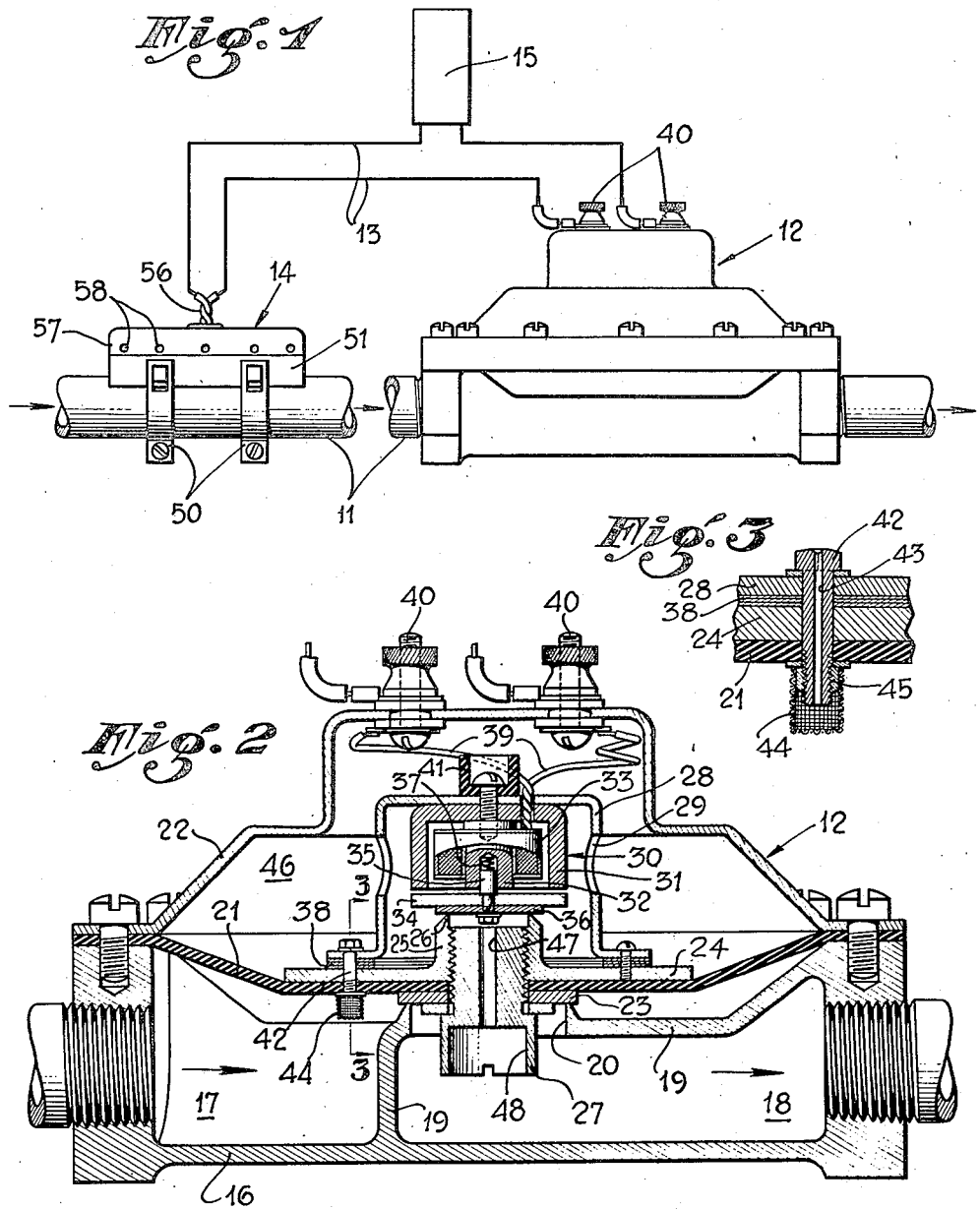
Inventor:
WILLIAM A. RAY,
By John H. Rouse,
Attorney.

May 15, 1945.  W. A. RAY  2,375,870
CONTROL SYSTEM
Original Filed Oct. 2, 1939   2 Sheets-Sheet 2
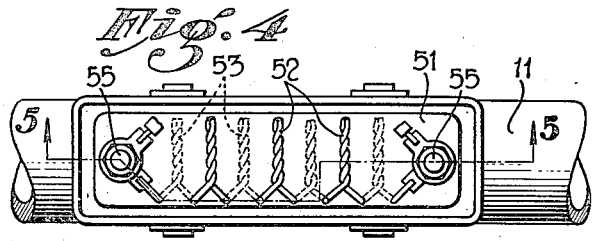
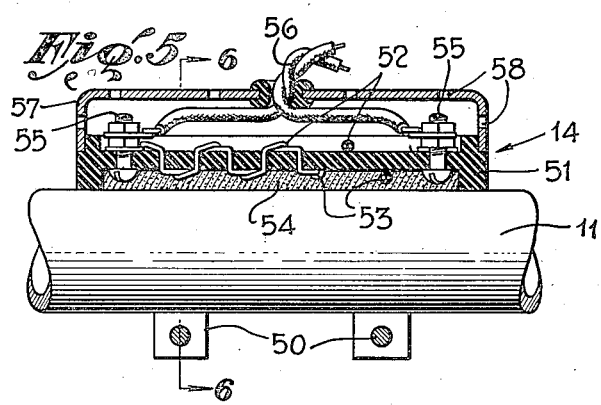
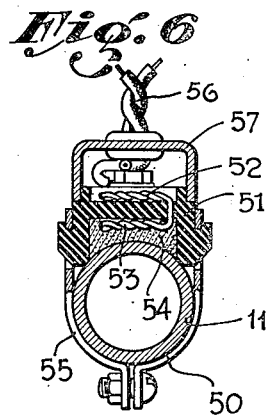
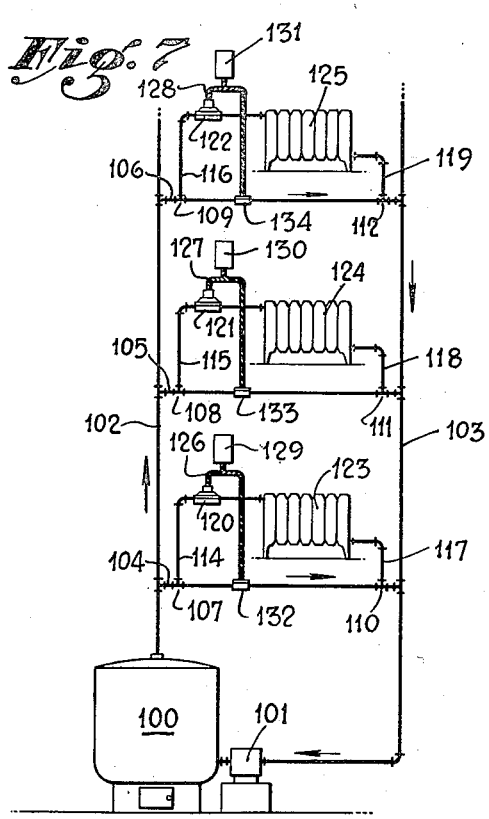
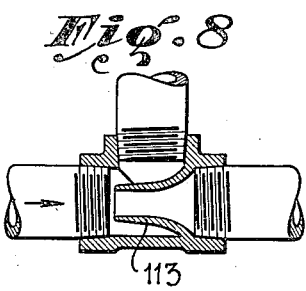
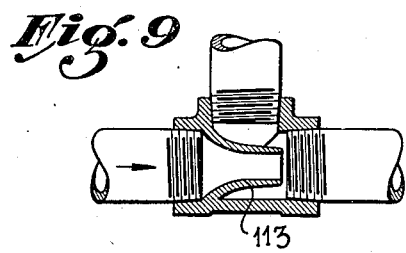
Inventor:
WILLIAM A. RAY,
By John H. Rouse,
Attorney.

Patented May 15, 1945

2,375,870

UNITED STATES PATENT OFFICE 2,375,870

CONTROL SYSTEM

William A. Ray, Los Angeles, Calif.

Original application October 2, 1939, Serial No. 297,490. Divided and this application October 19, 1942, Serial No. 462,463

1 Claim. (Cl. 237—8)

This invention relates to control systems which include thermoelectric generating means; the present application being a division of my copending application, Serial No. 297,490, filed October 2, 1939, now Patent No. 2,301,581, dated November 10, 1942.

An object of the invention is to provide means, responsive to the difference of temperature of a fluid within a conduit with respect to that of the surrounding atmosphere, for generating electrical energy in an amount sufficient for the operation of sensitive control devices.

Another object is the provision of a fluid control system wherein thermoelectric generating means, responsive to the temperature of the fluid, are arranged to energize valve means controlling passage of the fluid.

Another object is the provision, in a hot-water space-heating system, of thermoelectric generating means so arranged in the system as to be capable of generating a constant supply of electrical energy for the operation of control valves.

Other objects and advantages of the invention will be found in the description, the drawings, and in the claim; and for complete understanding of the invention, reference may be had to the following detailed description and accompanying drawings, wherein:

Figure 1 is a partly diagrammatic view of a fluid control system embodying my invention;

Figure 2 is a sectional view of the valve shown in Fig. 1;

Figure 3 is an enlarged fragmentary section taken along the line 3—3 of Fig. 2;

Figure 4 is a plan view, with cover 57 removed, of the thermoelectric generating device indicated at 14 in Fig. 1;

Figure 5 is a longitudinal section taken along the irregular line 5—5 of Fig. 4, with the cover in place;

Figure 6 is a transverse section taken along the line 6—6 of Fig. 5;

Figure 7 is a diagrammatic view of a hot-water heating system, including control means embodying my invention; and Figures 8 and 9 are enlarged sectional views of parts of the apparatus shown in Fig. 7.

Referring first more particularly to Figs. 1–3 of the drawings, the numeral 11 indicates a fluid conveying conduit wherein is connected an electrically operated control valve 12 which is electrically connected by wires 13, in series with a limit control or thermostat 15, to a thermoelectric generating device 14 mounted on the conduit.

The valve 12 comprises a casing 16 having an inlet 17 and an outlet 18 separated by a partition 19 which is provided with a main valve port 20. A flexible diaphragm 21, secured at its margin between the upper surface of the casing 16 and the flange of a housing or valve cover 22, is provided on its bottom surface with a main valve member 23, cooperable with the valve port 20. On the upper surface of the diaphragm 21 is a disk 24 having an upwardly-extending internally-threaded central portion 25 which provides at its upper end an annular pilot valve seat 26. A hollow screw 27, threaded in the portion 25, secures the disk 24 and the main valve member 23 to the diaphragm.

Secured by screws to the plate 24 is an inverted cup-shaped housing 28 having openings 29 formed in its side wall. This housing serves to support an electromagnet device, generally indicated at 30, and comprising an inverted cup-shaped outer core 31, a cylindrical inner core 32, and an energizing coil 33.

Arranged to be attracted by said cores when the same are energized is a disk-shaped armature 34, to the bottom surface of which is secured, by a threaded rod 35, a pilot valve member 36 cooperable with the seat 26. Guiding means for the armature is provided by the enlarged upper end portion of rod 35, preferably of non-magnetic material, which is freely slidable in a concentric cylindrical opening formed in core 32. A spring 37, compressed against the upper end of rod 35, urges the armature away from the cores. The position of the cores with respect to the armature, when the same is in its normal or un-attracted position, may be adjusted by variation of the thickness of the pile of shims 38. Means for externally connecting a source of current to the coil 30 are provided by leads 39 and terminals 40, insulatingly secured in the upper wall of the housing 22. A stop member 41, by engagement with the upper wall of the valve housing, limits the upward movement of the electromagnet housing and thus prevents possible shorting of the inner ends of terminals 40.

Constant fluid communication between the main valve inlet 17 and pressure chamber 46, which is defined by the upper surface of the diaphragm and the walls of valve housing 22, is provided by a screw 42 having a restricted opening 43 therethrough. Dependent on the character of the fluid which the valve is intended to control, this opening may be in the order of that formed by a No. 60 to No. 80 drill. A screen 44, soldered to nut 45, prevents possible clogging of the opening by foreign matter present in the fluid controlled by the valve.

Passageway 47 in screw 27 permits fluid communication between the chamber 46 and the main valve outlet 18 when the pilot valve member 36 is out of engagement with its seat 26. The lower end of screw 27 is extended below the main valve port 20 and also is provided with an enlarged bore 48. When the main valve is open, fluid flowing past the lower end of screw 27 produces an aspirating effect which tends to reduce the fluid pressure in chamber 46.

The operation of the valve shown in Figs. 1-3, and claimed in my hereinabove-mentioned co-pending application, Serial No. 297,490, is as follows: Assuming that the inlet end of the conduit 11 is connected to a source of fluid under pressure, when the electromagnet 30 is unenergized, the pressure above and below the diaphragm will be equalized by fluid flow from the main valve inlet into chamber 46 through the opening 43. The diaphragm being downwardly biased by the weight of the pilot valve assembly carried by it, the main valve remains closed. When the electromagnet 30 is now energized, the pilot valve is opened and the compressed fluid escapes from chamber 46 through passageway 47 more rapidly than it can enter through the restricted opening 43, permitting the fluid pressure below the diaphragm to move the same upward to open the main valve. When the electromagnet is now de-energized, the pilot valve closes and the resulting equalization of fluid pressure on either side of the diaphragm closes the main valve.

Referring to Figs. 4-6, the thermoelectric generating device, indicated at 14 in Fig. 1, will now be described. Secured by straps 50 to conduit 11 is a supporting member 51, preferably of molded thermal and electrical insulating material, having dependent side walls, the lower ends of which engage the conduit, and a connecting top portion spaced from the conduit. Extending through openings formed in said top portion is a series of pairs of thermoelectric elements, the elements of each pair being of dissimilar metals, twisted together and fused at their extremities to form at their opposite ends, and on opposite sides of said top portion, thermoelectrically opposed upper junctions 52 and lower junctions 53. The opposed junctions are conveniently termed in the art "hot" and "cold." The twisted end portions are bent laterally so that they lie close to the surface of either side of the top portion of member 51. The lower junctions 53 are arranged so as to be affected by the temperature of the fluid within the conduit, and the upper junctions 52 substantially solely by the temperature of the atmosphere surrounding the conduit, electricity being generated when the alternate junctions are at different temperatures.

To increase the transfer of heat between the wall of the conduit and junctions 53, the space between the conduit and the top portion and the side walls of member 51 may be filled with a cement 54 which has relatively good heat conducting property but which is substantially a non-conductor of electricity. A cement suitable for this purpose can be prepared by mixing pulverized marble with a resinous binder. Terminals 55 are provided for connecting the opposite ends of the series of elements to external leads 56. A protective cover 57 for the device is provided with openings 58 for free circulation of air to the upper junctions.

For the system shown in Fig. 1 to be operative, it is necessary that the conduit 11 be at a different temperature, either higher or lower, than that of the surrounding atmosphere. This will be the case when the conduit is employed to convey, for example, refrigerant, steam, or hot water. Under such conditions, sufficient power will be generated by the thermoelectric device to energize the electromagnet of valve 12. This electromagnet, when constructed of high permeability magnetic materials, will operate on power of less than one milliwatt when it is so adjusted that the distance through which the armature must be moved is but a few one-thousandths of an inch. Movement of the pilot valve member through such a distance is sufficient, with the construction shown, to vent the upper chamber and so permit operation of the main valve.

In the system disclosed in Fig. 1, it will be seen that the valve 12 will operate automatically under the control of the device 15 which, for example, may be a thermostat responsive to a temperature condition resulting from the operation of the valve.

Obviously, when more or less thermoelectric power is required, the number of pairs of elements and/or the area of the conduit surface employed for transfer of heat or cold to the lower junctions may be varied to suit. Or, a sensitive relay, energized by the thermoelectric device, may be employed to control a conventional electrically operated valve.

In a steam control system, suitable drainage should be provided so that the portion of the conduit to which the thermoelectric generating device is secured will be subjected to the steam and free from condensed water when the valve is closed.

Referring now to Figs. 7, 8 and 9, wherein a hot water heating system for a plurality of rooms or spaces is disclosed, the numeral 100 indicates a source of hot water which is constantly circulated in the direction of the arrows by a pump 101 through main conduits 102 and 103 and their interconnecting branch conduits 104, 105 and 106.

Connected, one in each of said branches, are like fittings 107, 108 and 109, an example of which is shown in detail in Fig. 8, and other like fittings 110, 111 and 112, an example of which is shown in Fig. 9. The fittings shown in Figs. 8 and 9 are identical in structure and each comprises a pipe T having an internal projecting spout 113. The fittings 107, 108 and 109 are connected in the branch conduits, as shown in Fig. 8, with their spouts projected in the opposite direction to that of the flow of water in the branches and thus act to divert some of the water upward into the vertical pipes 114, 115 and 116. The other fittings 110, 111 and 112 are connected, as shown in Fig. 9, with their spouts projected in the direction of water flow and thus act as aspirators to produce a partial vacuum in the vertical pipes 117, 118 and 119.

Connected respectively, through valves 120, 121 and 122, to each of the pairs of vertical pipes are conventional hot water radiators 123, 124 and 125. The valves are electrically connected by cables 126, 127 and 128, through room thermostats 129, 130 and 131, to thermoelectric generating devices 132, 133 and 134, respectively. The valves and thermoelectric generating devices may be of the type shown in Figs. 1-6 and function in a similar manner to that of the system shown in Fig. 1 and described hereinabove in connection therewith, the main difference being that in the system of Fig. 7 the thermoelectric devices are connected to portions of the conduit through which the hot water is constantly circulated, even when the radiator control valves are closed. As has previously been noted, in a steam-heating system, suitable drainage is provided so that the portion of the conduit ahead of the valve, and on which the thermoelectric generating device is mounted, remains hot even when the valve is closed. In accordance with the demand of their individual thermostats, the valves, energized by the thermoelectric devices, open to permit that part of the hot water flow which is influenced by the special fittings 107—109 and 110—112 to pass through the radiators.

While I have herein shown and described specific embodiments of my invention, I wish it to be understood that modifications may be made without departing from the spirit of the invention, and that I intend therefore to be limited only by the scope of the appended claim.

I claim as my invention:

In a temperature-changing system for a plurality of spaces: a main conduit having portions respectively adjacent each of said spaces; a source of fluid, the temperature of which differs substantially from the desired temperature of the spaces; means for continuously circulating said fluid through said main conduit; a secondary conduit for each of the spaces and by-passing the corresponding adjacent portion of the main conduit; there being for each of the spaces a heat-exchanger connected in the secondary conduit for the corresponding space, an electrically operated valve for controlling passage of said fluid through the heat-exchanger, a thermoelectric generating device for energizing the valve, and means responsive to the temperature of the space for controlling the energization of the valve; and means for subjecting said thermoelectric generating devices to the temperature of the fluid in the corresponding adjacent portions of the main conduit.

WILLIAM A. RAY.